United States Patent [19]

Hary

[11] Patent Number: 5,293,385
[45] Date of Patent: Mar. 8, 1994

[54] METHOD AND MEANS FOR USING SOUND TO INDICATE FLOW OF CONTROL DURING COMPUTER PROGRAM EXECUTION

[75] Inventor: Joseph M. Hary, San Jose, Calif.

[73] Assignee: International Business Machines Corporation, Armonk, N.Y.

[21] Appl. No.: 815,295

[22] Filed: Dec. 27, 1991

[51] Int. Cl.$^5$ .............................................. G06F 11/00
[52] U.S. Cl. ...................................... 371/19; 395/375
[58] Field of Search ................ 371/19; 395/159, 155, 395/375

[56] References Cited

U.S. PATENT DOCUMENTS

| | | | |
|---|---|---|---|
| 4,696,003 | 9/1987 | Kerr et al. | 371/19 |
| 4,802,165 | 1/1989 | Ream | 371/19 |
| 4,830,315 | 3/1989 | Saito et al. | 371/19 |
| 4,872,167 | 10/1989 | Maezawa et al. | 371/19 |
| 4,943,968 | 7/1990 | Hirose et al. | 371/19 |

OTHER PUBLICATIONS

"Using QBASIC®" by P. Feldman et al., ©1991 by Que® Corp. pp. 99, 100 and 722 WordPerfect®, ver 5.1, Documentation pp. 851-853.
The Norton Utilities, Advanced Edition Version 4.5 Reference Manual ©1988 Peter Norton Computing, Inc. pp. 40-46.
Dictionary of Computing, pp. 330-331.
The Principles of Computer Organization, by G. Michael Schneider, pp. 440-462.
"Earcons and Icons: Their Structure and Common Design Principles", Blattner et al, Human-Computer Interaction, 1989, vol. 4, pp. 11-44.
"Towards a Theory of the Cognitive Processes in Computer Programming", Ruven Brooks, Int. J. Man-Machine Studies (1977) 9, 737-751.
"Perspectives on Algorithm Animation", Marc H. Brown, 1988, pp. 33-38.
"Deriving Psychophysical Relations for Timbre", ICMC 86 Proceedings, Daniel J. Freed, et al, pp. 393-405.
"Animating Programs Using Smalltalk", R. L. London et al, Aug. 1985, IEEE, pp. 61-71.
"The Representation of Line Graphs Through Audio-Images", D. L. Mansur et al, Sep. 25, 1984, pp. 1-15.
"Stimulus Structures and Mental Representations in Expert Comprehension of Computer Programs", Pennington, Cog. Psyc. 295-341 (1987).
"The Sound of Data", Peterson, Science News, vol. 1, 1985, pp. 348-350.
"Control Flow and Data Structure Documentation: Two Experiments" Shneiderman, Human Aspects of Computing, vol. 1, pp. 55-63.
"Proceedings of the Twenty-Third Annual Hawaiian International Conference on System Sciences", Infosound: An Audio Aid to Program Comprehension, Sonnewald, 1990 IEEE, pp. 541-546.
"Design Guidelines for the Use of Audio Cues in Computer Interfaces" Sumikawa, Jul. 1, 1985, pp. 1-25.

Primary Examiner—Vincent P. Canney
Attorney, Agent, or Firm—Baker, Maxham, Jester & Meador

[57] ABSTRACT

The invention supports the use of sound attributes generated in response to execution of a computer program to communicate information about program and data structure dynamics during computer program execution.

11 Claims, 7 Drawing Sheets

ELEMENT MAPPING TABLE

| KEYWORD (MESSAGE) | ENABLE/DISABLE | SOUND TOKEN | PARAMETERS |
|---|---|---|---|
| • | • | • | • |
| • | • | • | • |
| • | • | • | • |

*FIG. 2*

SOUND TOKEN MAPPING TABLE

| SOUND TOKEN | SOUND COMMAND |
|---|---|
| • | • |
| • | • |
| • | • |

*FIG. 6*

METHOD AND MEANS FOR USING SOUND TO INDICATE FLOW OF CONTROL DURING COMPUTER PROGRAM EXECUTION

BACKGROUND

This invention relates to providing a discernable indication of execution of a computer program. More particularly, the invention relates to the use of sound to indicate the flow of control or data during program execution. More specifically still, the invention relates to the use of sound attributes to discriminate and localize software anomalies in the debug context. A reduction to practice has been made in a mixed-type procedural language (C) and an object-oriented language (SmallTalk/V).

Debugging is taken to be a measure of functional efficacy of a computer program as applied to segments of the program. Relatedly, the patent and technical literature shows debugging facilities which employ elaborate visual indications of software function. For example:

as where source code segments are mapped onto an execution progress displayed in graph constructs (Saito et al, U.S. Pat. No. 4,730,315);

as where source code is executed in different versions and perceived differences are displayed (Kerr et al, U.S. Pat. No. 4,696,003);

as where test case statements exercised by target software and executed results are displayed and self-checked (Bird, U.S. Pat. No. 4,464,655); and as where source code is selectively traced at run time by means of command line arguments without recompiling (Ream, U.S. Pat. No. 4,802,165).

Audio evidence of computer program events is used in a number of automated contexts. In an article entitled "Infosound: An Audio Aid to Program Comprehension" by Sonenwald, et al, Proceedings of the Twenty-Third Annual Hawaii International Conference on System Sciences, Vol. II, 1990, pp. 541-546, description is given of a system which links musical sequences and special sound effects to application program events. Audio cues ("earcons") corresponding to visual cue ("icons") are provided in a computer interface described by Sumikawa, et al in "Design Guidelines for the Use of Audio Cues in Computer Interfaces", UCRL-92925, Lawrence Livermore National Laboratory and University of California, Davis, Jul. 1, 1985. Peterson ("The Sound of Data", Science News, Vol. 127, Jun. 1, 1985, pp. 348-350) suggests that object attributes can be discerned from time-varying audio signatures mapped from patterns in numerical data, infrared spectra, chemical compounds, and the like. The prior art also teaches computer system audio outputs for entertainment, target illumination, alarm and threshold purposes. However, the inventor is aware of no reference which teaches the use of sound attributes to discriminate and localize software anomalies in the debug context.

Accordingly, the need exists for a method and a means employing sound in the software development environment. Preferably, sound would be employed to communicate global information about computer program execution and data structures. Advantageously, such a technique would provide an auditory indication of flow of program control and data flow in response to program execution. The unexpected result provided by use of non-speech sound in this manner would be enhancement of a programmer's debugging ability and understanding of program operation.

SUMMARY OF THE INVENTION

Accordingly, a principal object of this invention is to provide a method and means employing non-speech sound in the software debugging environment. A primary advantage of such a technique would be the communication of significant information about program control and data flow during program execution.

The invention encompasses a method, executable on a computer, for audibly communicating computer program execution. In practice, the method steps:

identify respective syntactical elements in a computer program as syntactical cues;

map a set of syntactical cues in the computer program into a set of sound properties;

execute a computer program; and during execution of a procedural sequence of the computer program, generate a sequence of sounds in response to syntactical cues contained in the procedural sequence.

The invention also comprehends a system which audibly communicates computer program execution, and which includes:

a mapping component which identifies respective syntactical elements of a computer program as syntactical cues and maps the set of syntactical cues into a set of auditory events; and an auditory response element for generating a sequence of sounds in response to syntactical cues contained in a procedural sequence of the computer program during execution.

The objectives and advantages stated above, and other benefits of this invention are realized in an embodiment which is disclosed in the following detailed description and illustrated in the below-described drawings.

BRIEF DESCRIPTION OF THE DRAWINGS

FIG. 2 is a representation of an element mapping table.

FIG. 6 is a representation of a sound token mapping table.

FIG. 6 presents a flow chart of an auditory event editor.

INTRODUCTION

Figure 1:
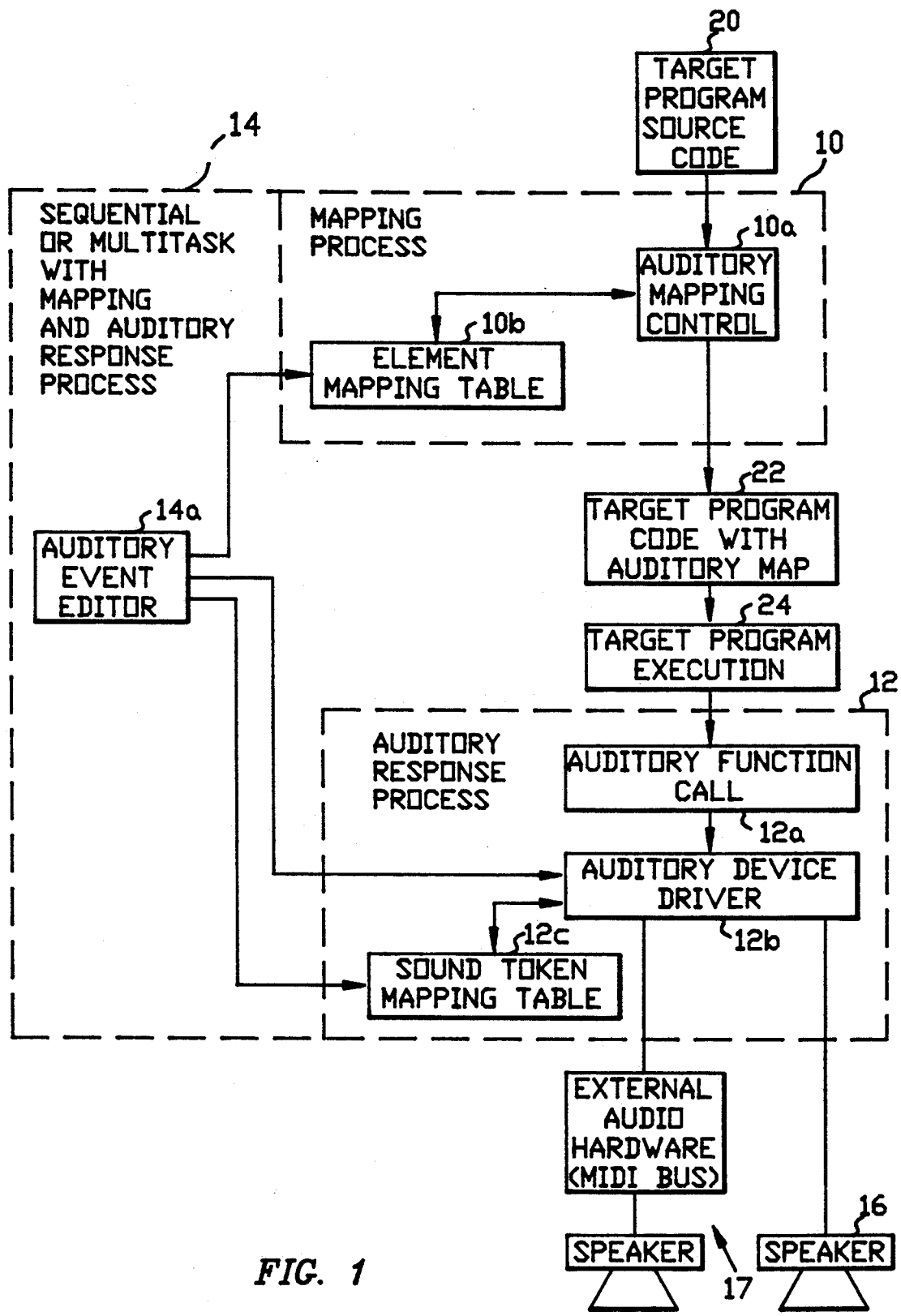
FIG. 1 a schematic overview of the invention illustrating an auditory mapping control element for mapping computer program elements to auditory properties and an auditory debugging process for providing an auditory output indicative of procedural or data flow in the computer program.

In the invention, a "sound mapping" is an association of a sound to an object or event in a software development environment (SDE). An object in a software environment is anything with a well-defined boundary that can be manipulated or preceived by the user of the environment. When used herein, an "object" can be a software module or function, a software class or instance in an object-oriented programming system, a selectable icon, a program or file, or even a programming keyword. An "event" is an action within the environment such as the action of deleting a file, the transfer of control from one program to another, and the interaction of objects such as placing one icon on top of another.

The inventor has observed that when events, objects, and interactions of objects are associated with appropriate sounds, a sequence of sounds is produced when the program executes or a user performs the task with a software environment. It is asserted that the patterns of sound created by these sequences can communicate important information about the structure of a program or the state of the program's environment. Such communication can only occur if a user can learn the meaning of the sound mappings or gain information from a sequence of sounds produced by a series of events.

Central to the motivation for the invention is the gestalt property of patterns. The sound sequences produced by the invention have "emergent" properties in that users can discover meaningful patterns resulting from the sound mapping technique of the invention because the patterns recur. For example, over time, users may become familiar with the sequence of sounds produced by software algorithms when flow of control keywords are mapped with sound. When users have learned the sound patterns, they should be able to distinguish one algorithm from another and detect bugs in software algorithms based upon how they sound.

The inventor anticipates that a user's knowledge about the software system, program, or environment should influence his ability to detect meaningful patterns when sound mapping is employed according to the invention. A user that has a detailed knowledge of software algorithms will more quickly learn to associate sound patterns to algorithmic structure than someone with only a general knowledge of programming. In addition, experienced users will be able to make use of fine structure in sound patterns in order to be able to distinguish among different classes of sort algorithms, for example.

The invention relies both upon mapping sounds to important events and objects and on the user's discovery of emergent patterns in sequences of sound. As stated in the Background section, the mapping of sound to events and objects of a computer program is in the spirit of the "earcon" approach. In this regard, the "earcon" is a motif of sounds or characteristic combination of sound properties assigned to an action or an object. The user must learn these mappings to identify the action or object. The focus of the invention, however, is to enable the user to discover characteristic patterns in sequences produced by a sound mapping based on the user's knowledge of programming in the software environment of a programming application. It is through the relationship of the sounds produced by events and object interaction that the invention communicates information to the user. The invention permits users to employ the pattern detection capabilities o their auditory system and their knowledge of software development to determine the meaning of the emergent patterns of sound produced by execution of computer programs.

The invention, therefore, focuses on low-level mapping of sounds to sequences of program events in order to produce meaningful auditory patterns. Thus, the association of a sound to an individual event is de-emphasized, while the invention enables the user to discover sound mappings that communicate the relationship of events in the inherent structure of an object such as a program algorithm. In this regard, the invention maps molecular events inherent in a computer program with sound; such a mapping may include, for example, the change of control flow in a computer program that results from a conditional test in an "if" statement. Execution of a program produces an auditory response that enables the user to detect emergent patterns in this sound mapping. Each individual change in flow of control may be relatively meaningless, but an aggregation of changes communicates important information, such as the current algorithm being executed, the exception conditions, and bugs in the program flow.

Non-speech sound has many psychophysical and musical properties. Hereinafter, these are referred to as "auditory" properties. These properties include: pitch, timbre, harmony, volume, melody, reverberation depth, and rhythmic variation. In order for an auditory property to be salient in a programming environment, the user must be able to identify how the property communicates information and to distinguish it from other properties that might be sounding simultaneously. These properties are appropriately mapped by the invention to events, objects, and context information in an SDE.

Mapping of an auditory property or combination of auditory properties to an event within a software program or environment is "event mapping". Consider, for example, playing a timbre with a given pitch when flow of control is transferred to a program function. Flow of control transfer to the function is the event that the sound represents. This simple sound mapping would play a rhythmic sequence of sounds that depends upon the number of function calls within a program and the length of time that the program spends within the function.

"Object mappings" involve the assignment of sounds to software objects, such as modules, functions, data structures, and variables. In the invention, the sound of an object mapping is triggered principally by an event. In the above example, a sound could be mapped to modules instead of transfer of control flow events. The transfer of control flow would then trigger the sound mapping of the modules. Different pitches could be assigned to different modules within the program so that when the program is executed, a melody would play as program flow of control was transferred to different modules. The user would be able to detect different orders of module calls by listening to the melody of the executed program.

The sound mappings of objects and events can also interact or mix to produce a new sound. For example, the sound of an event could have a fixed pitch such as the transfer of flow of control to a module. Sound properties of different timbres could be mapped to different program modules. In this case, the user would not hear a melody, but a series of changing timbres at a constant pitch as a program executed. This kind of mapping would be effective, for example, in a multi-tasking environment, where control flow events for each task might be given a constant pitch, but the timbre of each task might be made to depend upon the module that was currently executing within the task. The user would hear chords with notes of changing timbre with the concurrent execution of tasks. In this example, the pitches of the control flow events for each task make up the notes in the chord and the timbre of each note depends on the current executing module within each task. The chord would communicate the current state of the environment with reference to control flow and task execution. This information might aid in synchronizing real-time processes in a multi-tasking environment.

"Context mapping" of sound involves transforming the sound of an object or event when two or more events interact, one object subsumes another object, or a change occurs in the environment that supports the objects or events. A context mapping would be predetermined, with the system developer defining the sound attributes of objects to enhance the interaction.

One example of context mapping can be understood with reference to a direct manipulation interface. When a user places one object, such as a file folder within another object, such as a window, the sounds assigned to the window and the file folder would interact with each other. If the sounds were properly assigned to the window and folder objects, the sound of the object interaction would cue the user as to which window was acted upon and even the number of objects currently residing in the window.

DETAILED DESCRIPTION OF THE PREFERRED EMBODIMENT

The invention covers a method and means for debugging computer programs using sound to indicate salient properties of program execution including flow of control, data flow and message flow. The invention encompasses a technique for mapping auditory events to syntactical elements of computer programs. In this regard, an "auditory event" is a sound with a particular auditory property or set of auditory properties. The syntactical elements include data modification elements such as assignment operators that assign a value to a variable, program flow of control elements in procedural programming languages, such as conditional and looping keywords, and message-passing events in object-oriented systems. The invention further provides for modification of auditory events during computer program execution.

A schematic overview of the invention is illustrated in FIG. 1. In FIG. 1, the invention is presented as an auditory debugger including a mapping process element 10, and auditory response process element 12, and an editing process element 14. As FIG. 1 illustrates, the mapping and auditory response elements 10 and 12 are processes which are invoked sequentially with respect to each other, and either sequentially or in a multi-tasking mode with respect to the editing process 14. The mapping and response processes 10 and 12 together comprise an auditory debugger in which the mapping process 10 includes an auditory mapping control 10a to assign auditory events to syntactical elements in a computer program. In this respect, the auditory mapping control 10a accesses an element mapping table 10b to associate syntactical elements in a target program with auditory events. The response process 12 includes an auditory function call interface 12a that receives auditory events and sends them, together with control parameters, to an auditory device driver 12b. The auditory device driver 12b translates the auditory events into commands that produce sound on a speaker 16 which is internal to a processor or on external musical hardware 17, which may include a MIDI bus and associated components.

The element mapping table 10b associates respective syntactical elements with sound tokens. The sound tokens represent auditory events. The auditory mapping control element 10a performs a line-by-line inspection of a target program source code 20. The auditory mapping control element 10a does an element-by-element parse of each line of the source code 20. If an element is contained in the element mapping table 10b, the control element 10a places a function call in a syntactually correct position in the program source where the word is encountered. The function call includes the sound token which is associated in the element mapping table with the word and any corresponding parameters. The operation of the auditory mapping control 10a transforms the target program source code 20 into a target program code 22 with an auditory map. The target program is executed with the embedded auditory map at 24. Every time target program execution encounters an auditory function call, the interface 12a sends the call, together with the sound token and any associated parameters to the device driver 12b. The device driver 12b consults the sound token mapping table 12c to translate the sound token into a command, and executes the command under any parametric constraints included in the function call. Execution of the command either drives the internal speaker 16 or, if prefered, the external audio hardware 17.

The editing process 14 includes an auditory event editor 14a that allows the user to edit the tables 10b and 12c before, during, or after program execution, and thereby to control the sound that is produced by the hardware 16, 17. Such control can implement, for example, adjustment of volume, pitch, or timbre of the auditory event, or turning the sound on and off during program execution.

As thus summarized, the auditory debugging system illustrated in FIG. 1 allows users to hear dynamics of program execution and diagnose general problems related to program dynamics and interactions of multiple programs in a multi-processing environment.

The invention provides the following advances over the prior art:

the auditory event mappings are defined to encode global dynamics of program execution;

auditory events are mapped to selected program constructs or messages which translate program control flow, data flow, or message flow into sound patterns;

the mappings provide efficient translation of program execution information into auditory streams; and the auditory event editor gives users the ability to change attributes of mappings during program execution thereby imbuing the auditory patterns with more information than an arbitrary mapping of sound to program elements.

AUDITORY MAPPING PROCESS

The auditory mapping process 10 is responsible for assigning auditory events to syntactical elements of the target program source code. In the case of a procedural language, the mapping control 10a reads program text to locate keywords or expressions associated with flow of control or flow of data. In this case, the mapping control 10a could be a language precompiler or it could be built into the compiler itself. The mapping control 10a compares each element of each line with entries in the element mapping table 10b. Once a keyword or expression in the source code 20 is matched with an entry in the mapping table 10b, the mapping control 10a inserts into the program text a function call with the appropriate sound tokens and control parameters as units. When used herein, "sound token" is a symbol associated in the element mapping table 10b with a syntactical element that produces a unique sound when processed by the auditory device driver 12b. The function call containing the sound token and any parameters sends its arguments to the device driver 12b by way of the auditory function call interface 12a. Each function call initiates, stops, or changes a current auditory event. Default mapping is provided in the table 10b to encode data, control and message flow elements in the source code 20.

FIG. 2 illustrates the contents and structure of an element mapping table such as the element mapping table 10b in FIG. 1. In the representation of FIG. 2, the element mapping table is indexed by a keyword field in which keywords drawn from the language of the target program are placed. Hereinafter, these keywords may also be referred to as "keyword cues" since they "cue" the mapping process. Each indexed line of the table includes a first field ENABLE/DISABLE to indicate whether the keyword is enabled or disabled. The SOUND TOKEN field maps a sound represented by a sound token to the keyword which indexes to the line. Last, parameters establishing the auditory properties of the sound represented by the sound token are provided in the last field. The auditory event editor 14a is available to change the entries in the element mapping table if the user desires.

Figure 3:
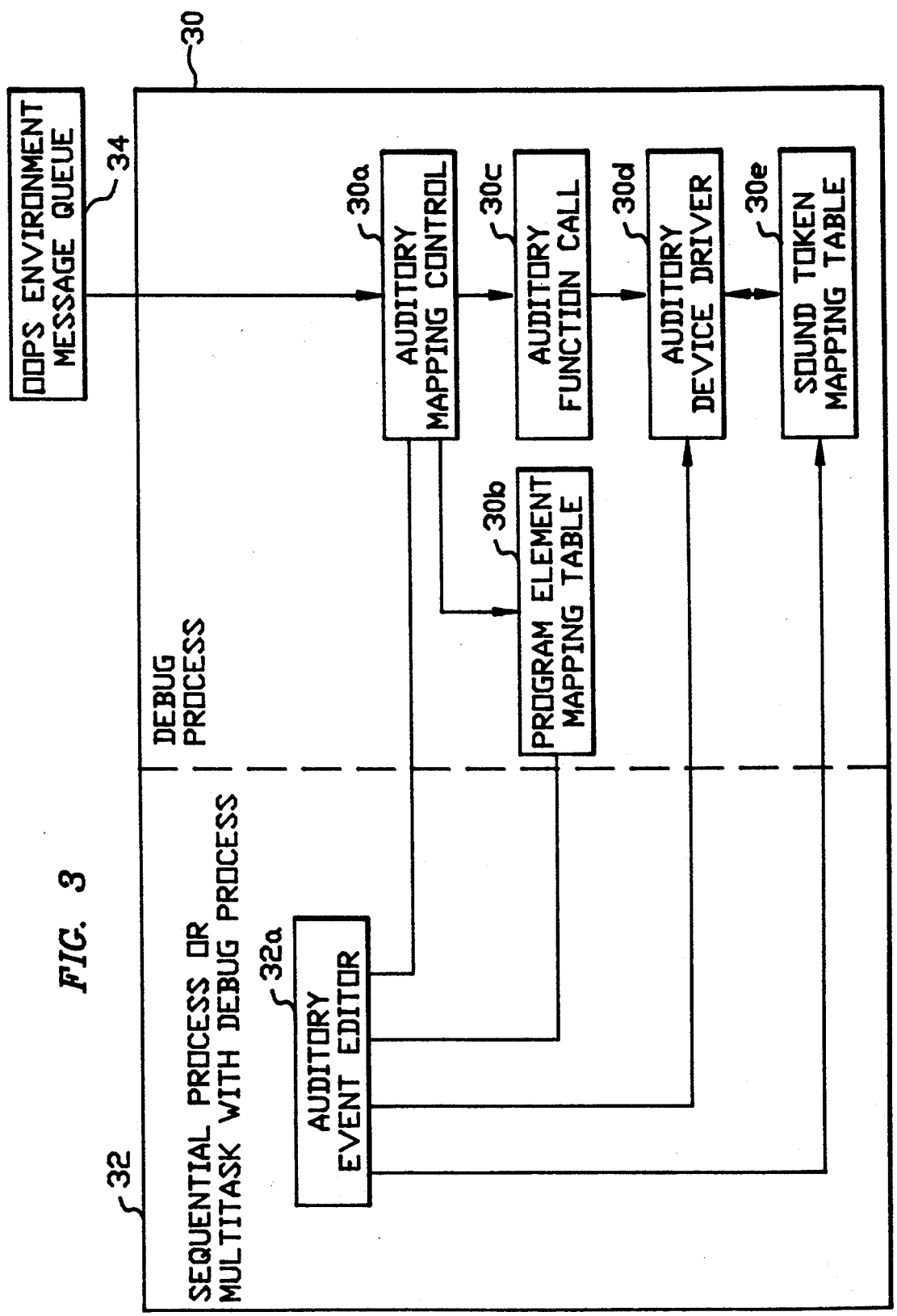
FIG. 3 is a schematic overview of the auditory mapping control and debugging element for messages in an object-oriented programming system.

In the case of an object-oriented language, or a language that relies on message passing for control, the auditory mapping control can assign auditory events to messages. In this case, the mapping occurs within the debug process as illustrated in FIG. 3. In FIG. 3, the debug process 30 has elements including an auditory mapping control 30a which accesses a program element mapping table 30b and which feeds an auditory function call 30c. The auditory function call 30c calls for execution of auditory functions by an auditory device drive 30d which has access to a sound token mapping table 30e. An editing process 32 is executed either sequentially or in parallel with the debug process, and includes an auditory event editor 32a which has access to the auditory mapping control 30a, the program element mapping table 30b, the auditory device driver 30d, and the sound token mapping table 30e. An object oriented programming system (OOPS) environment queues messages at 34; as the messages are dequeued from 34, they are passed through the debug process 30 for processing by 30a, 30c, and 30d. It is observed with respect to FIG. 3 that for procedural or dataflow elements of an object-oriented language, the mapping still occurs during a mapping process corresponding to that illustrated in FIG. 1. In FIG. 3, the auditory mapping control 30a is inserted as a filter at the output of the queue 34. As is conventional, the message queue 34 includes an ordered set of pending messages maintained in an object-oriented programming environment. When a message is fetched from the queue 34 that matches an entry in the program element mapping table 30b, the mapping control translates it to an auditory function call which is passed, via the interface 30c, to the device driver 30d. The structure of the program element mapping table 30b corresponds to that illustrated in FIG. 2, with the exception that the table is indexed by messages rather than keywords.

To be useful in a debugging context, the mapping controls of FIGS. 1 and 3 assign auditory events to syntactical elements in computer language environments. Although the function of the mapping control is similar in FIGS. 1 and 3, the type of syntactical element that is mapped is different depending upon whether program flow of control, data flow, or message flow is of interest. All three types of mapping can be available simultaneously. Each of these mappings will be discussed in more detail below.

FLOW OF CONTROL MAPPING

In order to understand and debug programs, programmers use flow of control elements related to iterative, sequential, and conditional constructs. In a procedural programming language, the constructs are usually rendered in the form of keywords of the language. Programmers understand and debug programs by reading these keywords while they scan the program text. Exemplary keyword cues for the C language are:

iterative cues: "for", "while"
conditional cues: "if", "else", "switch"
sequential cues: "return", "break"

The sequential keywords are unusual because they indicate exceptions to the normal statement-by-statement flow of control in which program statements are normally executed one after another. These exceptions communicate very important information for detecting unusual changes in the flow control.

Immediately following a target program source code expression containing iterative and conditional keywords and immediately preceding sequential keywords, the auditory mapping control inserts a function call to the audio device driver.

Figure 4:
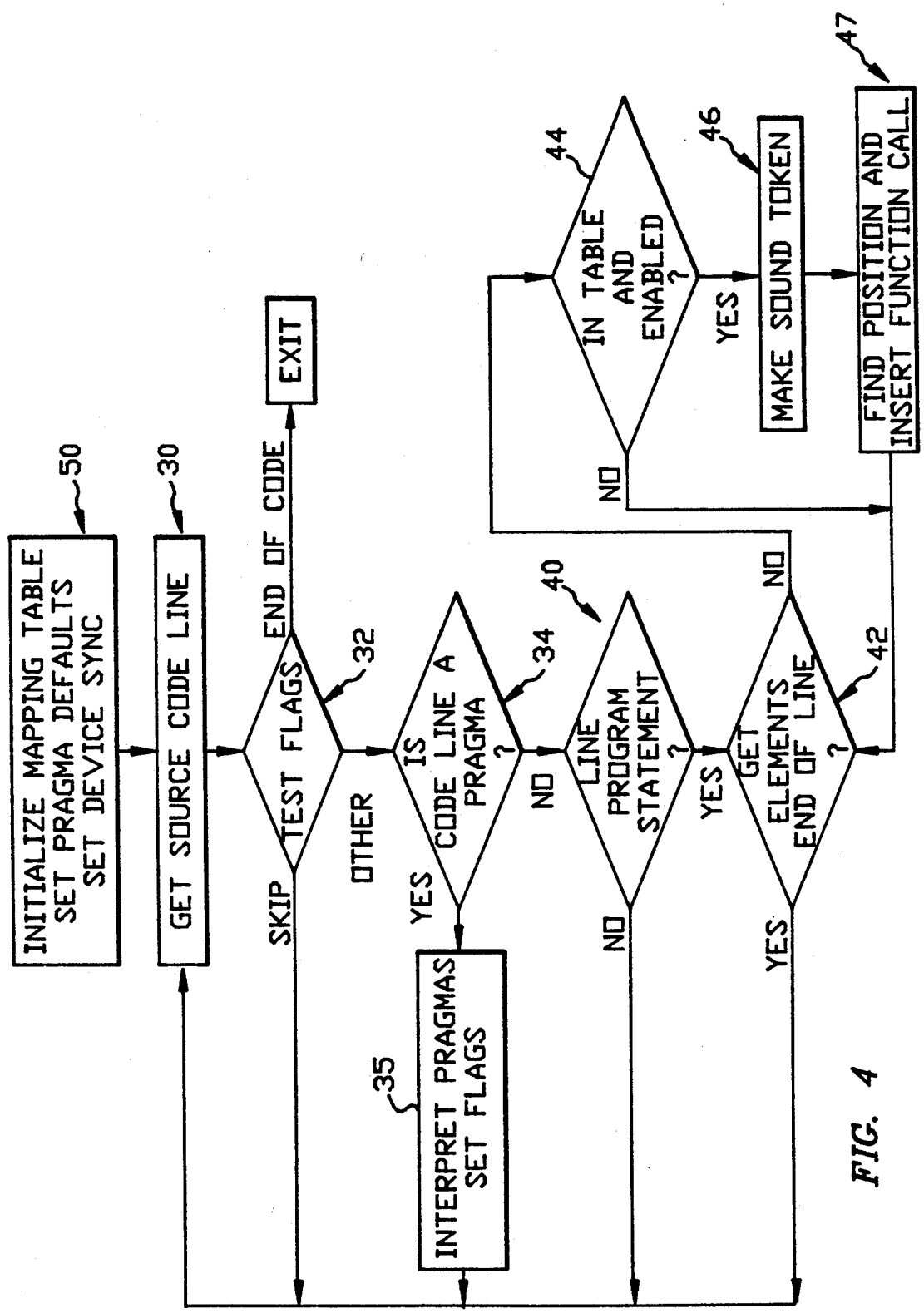
FIG. 4 presents a flow chart of an auditory mapping control implementation for flow of control or data flow mapping.

Refer now to FIGS. 1 and 4 and to Table 1 in the Appendix for an understanding of flow of control mapping. The auditory mapping control 10a essentially consists of two loops. The first loop 30, 32, 34, 35, 30 iterates over all of the target program source code 20, seeking compiler control statements ("pragmas") at decision 34 or program statements with imbedded flow of control keywords at decision 40. The loop 42, 44, 46, 47, 42 parses a program statement into individual flow of control (or data flow) keywords, obtains sound tokens from the element mapping table 20b and inserts an auditory function call into the program text (at 47).

Table 1 presents a pseudo-code illustration for mapping auditory events to program flow keyword cues. Table 1 assumes a C language environment, although this is not meant to be limiting. A list of keywords that indicate program flow of control is read into the variable "table" from the element mapping table 10b (line 100) that resides in storage. Data variables are then initialized. The "skip" flag (line 110) controls the overall mapping function. When "skip" is false, mapping occurs normally. When "skip" is true, mapping is suspended. This allows the user to skip chunks of the target program source code so that sound is only enabled for program fragments of interest. The "wait" flag (line 120) controls the synchronization of auditory events with the auditory function calls. If the "wait" flag is true (the default setting), this prevents the function call from returning until the function call is signaled by the device driver 12b. A "false" setting of the wait flag allows the function call to return immediately. All source code lines of the target program 20 are read and processed for flow of control keywords (lines 130-320). A line of code is fetched from storage (line 140). If the fetch returns an END_OF_SOURCE identifier, then the mapping control terminates (line 150). An END_OF_SOURCE identifier is generated when the end of a file or code storage is reached. The next lines check for pragmas in the source code. Pragmas are control or definition statements for precompilers or compilers placed in the target program source code by the user; they are usually not part of the target language definition. If a SOUND_MAP_ON pragma is detected, the skip flag is set to false (line 160). If a SOUND_MAP_OFF pragma is detected, the skip flag is set to true (line 170). As long as the skip flag is true, no further keyword processing will take place (line 180). The DISABLE and ENABLE keyword pragmas allow the user to enable and disable sound for individual keywords for different code fragments. The keywords are marked as enabled or disabled in the table (lines 190-200). The WAIT_ON and WAIT_OFF pragmas set the wait flag to control synchronization for different program fragments (lines 210-220). If a program statement is encountered, the line is parsed into syntactical elements (lines 230-310). Each syntactical element is fetched from the line (line 240) until the end of the line is reached (line 250). If a syntactical element in the form of a word variable matches a keyword in the table and that keyword is enabled for sound generation (line 260), a sound token for that keyword is fetched from the table. Next, the parameter list for the auditory function call is built using the sound token and the wait flag, and the auditory function call is inserted into a syntactically correct position in the program text (lines 270-300).

Consider the following example of flow control mapping:

Program code before precompile:

```
int x=0, y = O;
int inp();

soundControl SOUND_MAP_ON /*insure that sound is enabled*/ while( x < 10) { /*iterate through loop 10 times*/
    y = y + inp(0x330);  /*get value from input port 0x330
                           and accumulate in y*/
    if( y > = 80)        /*terminate loop if y exceeds
    break;               80*/ x = x + 1;           /*increment x */
                         /*end loop*/
}
```

This example illustrates the assignment of sound tokens to flow of control keywords.

The auditory function call, sound(), is inserted into syntactically correct positions in the program text next to appropriate keywords that indicate program flow. The function call, sound(), takes a sound token as its argument. There is a different sound token for each keyword, for example, the WHILE_TOKEN is associated with the while keyword.

Note that syntactically correct positions will vary for different program languages. For example, inserting a function call into the condition clause of an IF statement (as shown below) is not syntactically correct in many versions of Fortran; in Fortran, the function call should be inserted immediately before the IF statement.

Program code after precompile:

```
int x=0, y = 0;
int inp();
void sound();

while(sound(WHILE_TOKEN), x < 10) { /*iterate through loop
                                       10 times*/
    y = y + inp(0x330);     /*get value from input port 0x330
                              and accumulate in y*/
    if(sound(IF_TOKEN), y > = 80)
            {sound(BREAK_TOKEN)
            break;}         /*terminate loop if y exceeds 80*/ x = x + 1;              /*increment x*/
                            /*end loop*/
}
```

DATA FLOW MAPPING

The term "data flow" refers to the movement of data as it is modified or passed from process to process within the target program. Certain sound mappings can make data flow audible.

As those skilled in the art will appreciate, many computer aided software systems assume a data flow model. Such systems require the developer to regard an application as packets of data that are manipulated by program processes. The data flow model is an alternative to the control flow model which presents the data's view of the application.

FIGS. 1 and 4, and Table 2 of the Appendix illustrate the auditory mapping control element 10a as adapted for mapping auditory events to data flow elements.

To encode data flow, the auditory mapping control assigns a sound token to syntactical elements such as data operators and code representations of data objects. Data operators access or transform data. A data access operator obtains (but does not modify) a data structure or variable. Examples of data access operators include comparison operators or arithmetic operators on the right side of an equation. A data transformation operator transforms data via assignment to a variable or some other operation.

In a typed language such as C, Pascal and Fortran a data object is a typed variable or constant. In these languages, a variable, or storage location, can have a scalar or aggregate type. Examples of scalar variables include character, integer, or floating point types. Examples of aggregate variables include structures and arrays. Constants can also have scalar or aggregate types, but constants cannot be manipulated by operators.

A language expression consists of operands and operators. An operand consists of a data object or an expression that yields a data object. An operator indicates how the operands of an expression are manipulated.

In an object oriented language, objects can have aggregate types that consist of data objects, such as scalars, and code statements that specify how these objects are accessed and manipulated.

Examples of C Data objects/ Operators:

```
Scalar variables
int x,y,z;
x = 0;
y = 6;
z = 5;
x = y + z;

Aggregate variables
```

-continued
```
int a;
struct {
  int x,y;
  char z;
} example;

example.x = 5;
example.y = 6;
example.z = 'a';

a = example.x * example.y;
```

Combining data flow mappings with continuous or discrete auditory mappings for data objects yields four types of sound mapping for data flow: discrete access, continuous access, discrete transformation, and continuous transformation. Discrete access mapping would play a tone for a short period of time whenever a data element or structure is accessed. Continuous access mapping plays a continuous tone as long as the data object exists; accessing the data in the data object changes a sound attribute, such as pitch, timbre, or depth. Discrete transformation mapping plays a tone only when data is modified. Continuous transformation mapping plays a continuous tone whose sound attributes change when data is modified.

These auditory mappings can be applied at three levels of data objects: data types, aggregates or structures, and individual variables. Auditory mapping of a data type plays a tone whenever data of that particular type is accessed or modified. Auditory mapping of structures plays a tone whenever a structure is created, deleted, modified, or accessed. Auditory mapping of variables plays a tone on the accessing or modification of individual variables.

Data access and modification are indicated by assignment statements, input/output statements, creation, and destruction functions for structures and parameter passing. Continuous and discrete mapping is predefined in the program element mapping table. Continuous and discrete mapping can be altered by the auditory event editor by directly editing the program element mapping table. Following each of these statements, the auditory mapping control inserts a function call to the audio device driver. The program element mapping table contains entries for the type of data object and type of operator. These entries are combined to create a sound token for the auditory function call.

Table 2 presents a pseudo code fragment for an auditory mapping control optimized for data flow mapping (again, assuming a C language environment). The data object names, types, and operators are read from the program element mapping table (line 100). Variables are initialized and source code lines are read and checked for pragmas (lines 110-260) similar to the control flow example in Table 1. The pragmas for data flow mapping (lines 190-240) differ from the pragmas for control flow mapping. With the ENABLE_DATAOBJECT and DISABLE_DATAOBJECT pragmas, a user can enable or disable a data object or data type for sound mapping (lines 190-200). The ENABLE_ASSIGNMENT and DISABLE_ASSIGNMENT pragmas enable or disable all operations in the table associated with data assignment (lines 210-220). The ENABLE_ACCESS and DISABLE_ACCESS pragmas enable or disable all operators in the table associated with data access (lines 230-240). If a program statement is found, it is checked for a data object (lines 270-280). If the statement contains a data object, its matching operator is located in the statement (lines 300-310), otherwise the statement is checked for more data objects (line 280). The data object and its matching operator are compared against entries in the table (line 320). If both program elements are found in the table, and they are both enabled, the sound tokens for both objects are retrieved from the table. Next, a syntactically correct positions for the auditory function call is found, the sound tokens are combined to create a single sound token, the parameter list is built, and the auditory function call is inserted into the program text (lines 320-370).

Consider the following examples of data flow mapping:

```
Examples of data access operators
  int a, b;
  struct {float x, Y;} complex;    /*declare a complex number
                                     struct*/
  float z [10];                    /*declare an array of 10
                                     floating point
variables*/
  complex.x;                       /*access member x of struct
                                     complex*/ z[3];                            /*access the fourth element
                                     of array z*/ complex.x + complex.y;           /*access members x and y of
                                     struct complex and add
                                     them*/ a + b;                           /*access contents of a and
                                     and add them*/
Examples of data transformation operators
  x = a + b;                       /*add a and b and assign to
                                     x*/
  x++                              /*increment x by 1*/
  x += Y;                          /*add x and y and assign
                                     result to x*/
Example of data access mapping:
before:
  float result;
  struct {float x,y} complex;
  #soundControl ENABLE_DATAOBJECT complex.x
  #soundControl ENABLE_ACCESS
  result = sqrt((complex.x * complex.x) + (complex.y *
          complex.y));
                                   /*take the square root of
                                     the sum of the squares*/
after;

float result;
  struct {float x,y} complex;
  void sound();

result = sqrt((complex.x * complex.x) + (complex.y *
          complex.y));
                                   /*take the square root of
                                     the sum of the squares*/
sound(ACCESS_COMPLEX_X);
sound(ACCESS_COMPLEX_X);         /*sound token
                                   ACCESS_COMPLEX_X is an
                                   index to a Table that
                                   contains a mapping for
                                   the data object
                                   complex.x and a mapping
                                   for the data access
                                   operation*/

Example of data transformation mapping
before:
  float result;
  struct {float x,y} complex;
  #soundControl ENABLE_DATAOBJECT result
  #soundControl Enable_ASSIGNMENT result = sqrt((complex.x * complex.x) + (complex.y *
```

```
                            -continued
complex.y));
                        /*take the square root of
                        the sum of the
                        squares*/
after:

float result;
    struct {float x,y} complex;
    void sound();

result = sqrt((complex.x * complex.x + (complex.y *
        complex.y));        /*take the square root of
                        the sum of the
                        squares*/
    sound(ASSIGN_RESULT);
                        /*sound token
                        ASSIGN_RESULT is an
                        index to a Table that
                        contains a mapping for
                        the data object result
                        and a mapping for the
                        data assignment
                        operation*/
```

MESSAGE MAPPING

Figure 5:
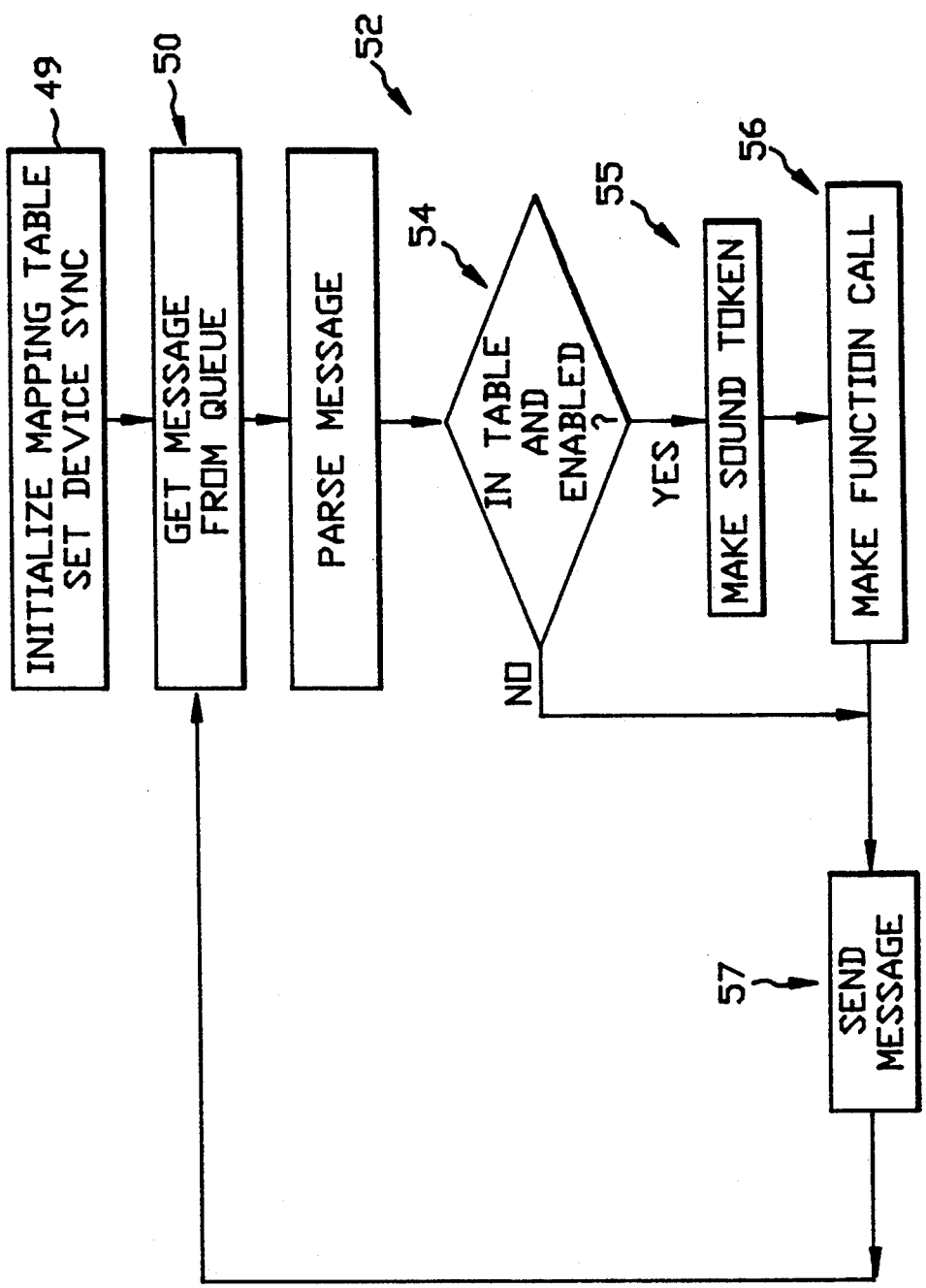
FIG. 5 presents a flow chart of an auditory mapping control implementation for messages in an object-oriented language.

Refer now to FIGS. 2, 3, and 5, and to Table III in the Appendix for an understanding of message mapping in an object-oriented environment. As is known, in an object-oriented computer environment, objects contain methods and data. The methods can contain procedural codes and are invoked by messages. Invocation of a method executes its procedure. Further, an object can send messages to other objects or an operating system event can send a message to an object. In a typical object-oriented environment, objects send messages to other objects by way of a message dispatcher contained within the environment. When an object sends a message, the message is placed in the dispatcher's message queue. At an appropriate time, the message is fetched from the queue by the dispatcher and routed to the destination object in order to invoke the destination object's method.

Thus, in FIG. 3, the debug process 30 acts as a filter between the message queue 34 and the destination object. The auditory mapping control element 30a for messages runs at the same time as the debug process 30. For each message, the auditory mapping control element 30a looks up the message entry in the program element mapping table 30b. The program element mapping 30b has the form illustrated in FIG. 2 and described above, with the sole exception that the table is indexed by message types (MESSAGE) which are included in the repertory of messages for the OOPS environment. The inventor contemplates that entries in the table 30b could also exist for types of source and destination objects, which are characteristically identified in object-oriented messages. When the table 30b is accessed, all entries related to an indexed message are retrieved. A sound token is taken from entries of the table indexed by the message.

The flow chart for the mapping control for messages is illustrated in FIG. 5. The mapping control process of the element 30a consists of a loop 50, 52, 54, 55, 56, 57, 50 which fetches messages from the message queue (step 50) and determines if the message should be mapped with a sound (step 52). If the parsed message has an entry and is enabled in the program element mapping table 30b (step 54), a sound token is constructed for the message in step 55 and an auditory function call is made to the auditory device drive in step 56. Every message, whether mapped with sound or not, is passed to the destination object in step 57 and a new message is fetched from the queue.

Table III presents a pseudo code fragment for an auditory mapping control optimized for message mapping. The mapping does not occur at compile time, so no function calls are inserted into the program text. A message is immediately translated into a sound token and a call is made to the auditory device driver. The auditory mapping control runs in the same process or at the same time as the debug process. After initialization (line 100), a loop is entered to process messages (line 110). A message is fetched from the message queue of the dispatcher (line 120). If an exit message is received, the mapping control terminates (line 130). The message is parsed into its component parts including the message name, the source object, the destination object and the number of arguments that the message contains (line 140). If the message name is found in the table and the name is not associated with a disable flag (line 150), then the table is searched for any sound tokens associated with the message components (line 160). Note that the only way to disable or enable a message name is to directly edit the table with the auditory event editor. Once the sound tokens for the message components are found, they are combined into a single sound token, and an auditory function call is made to the auditory device driver (lines 170–180). The message is then passed on to the destination object (line 200). The wait flag for synchronizing the function calls to sound production must be set by the auditory event editor.

AUDITORY DEBUG PROCESS ELEMENT COMPONENTS

In FIG. 1, the schematic overview of the auditory debug process for flow of control and data flow is presented. The schematic overview of this process for message flow is illustrated in FIG. 3. Both debug processes are essentially identical, with the exception that the debug process for the message flow also contains a mapping component as described above. The auditory function calls 12a and 30c pass sound tokens and control parameters to the auditory device drivers 12b, 30d and are responsible for waiting for a sound until it stops playing or for returning immediately to the calling program, depending upon the "wait" flag setting. The auditory device drivers 12b and 30d receive sound tokens and control parameters from the function call and translate them into commands for sound generating devices, using the sound token mapping tables 12c, 30e. A representative format for the sound token mapping tables is illustrated in FIG. 6 and simply associates with each sound token an appropriate sound command. The sound generating devices can include sound generator hardware or software sound drivers for internal work station speakers (represented by speaker 16 of FIG. 1). Also, the device drivers 12b and 30d are able to drive a MIDI (musical instrument device interface) bus included in external audio hardware (reference numeral 17 in FIG. 1) to allow maximum flexibility in assigning sounds to keyword and message cues by using commercially available sound generation equipment.

Use of a MIDI-driven sound generation equipment in the external audio hardware (represented by reference number 17 in FIG. 1) enables the device drivers to produce sounds with variable pitches and timbres. A different timbre can be generated for each function call. The default mapping of timbre to sound token in a sound token mapping table can be changed by editing the sound token mapping table with an auditory event editor. The control parameters which accompany the sound tokens and are passed to the device drivers by the function calls control flow of sound and include parameters such as global on/off, start, stop, wait, pause, and resume. The device drivers are responsible for signaling the function calls to allow the calls to return to the calling program. The auditory event editors maintain configuration files for the device drivers. These files contain the tables that map the sound tokens from the function calls and to sound device parameters. Further, in a multi-tasking system environment, the auditory function call can send sound tokens and sound commands to the auditory device drivers by way of the function call interfaces. The editors can also change the sound token mapping tables during program execution to provide finer control over program sound. The debug process for messages illustrated in FIG. 3 is independent of the debug process for procedural and data flow elements illustrated in FIG. 1; however, both debug processes can operate concurrently to provide auditory information about procedural, data flow, and message elements within the execution of an object-oriented program.

AUDITORY FUNCTION CALL

Table 4 presents the pseudo-code fragment of a function call. The auditory function call provides the interface between an executing program and an auditory device driver. The function call is inserted at the appropriate points in the executing program by the auditory mapping control for control or data flow elements. In an object oriented environment, a process that monitors the message queue of the message dispatcher makes the function call when the appropriate messages are encountered. The parameters of the function call can be sound tokens or global sound commands.

In Table 4, the function call first calls an auditory device driver in order to insert its parameters into the message queue of the device driver (line 100). The call then returns immediately from the device driver call and waits for a signal from the device driver (line 110) if the wait flag of the function call was set. When it receives a signal, the function call returns to the calling program (line 120). The WAIT statement allows the synchronization of auditory events to function calls. The WAIT can be enabled and disabled at the device driver level if the user so chooses. The auditory event editor can issue commands to the device driver to enable or disable the WAIT.

AUDITORY DEVICE DRIVER

The device driver runs as a background process and controls the sound generation devices. The sound generation devices can either be software sound generators or internal or external hardware The auditory device driver is responsible for initializing a sound generation device, handling commands for global sound control, translating sound tokens into sound generation device commands and synchronizing the generation of sound with program execution by a signaling mechanism to the calling function. The device driver also supports a queue of function call messages. The device driver is started before the execution of the debug process.

Figure 7:
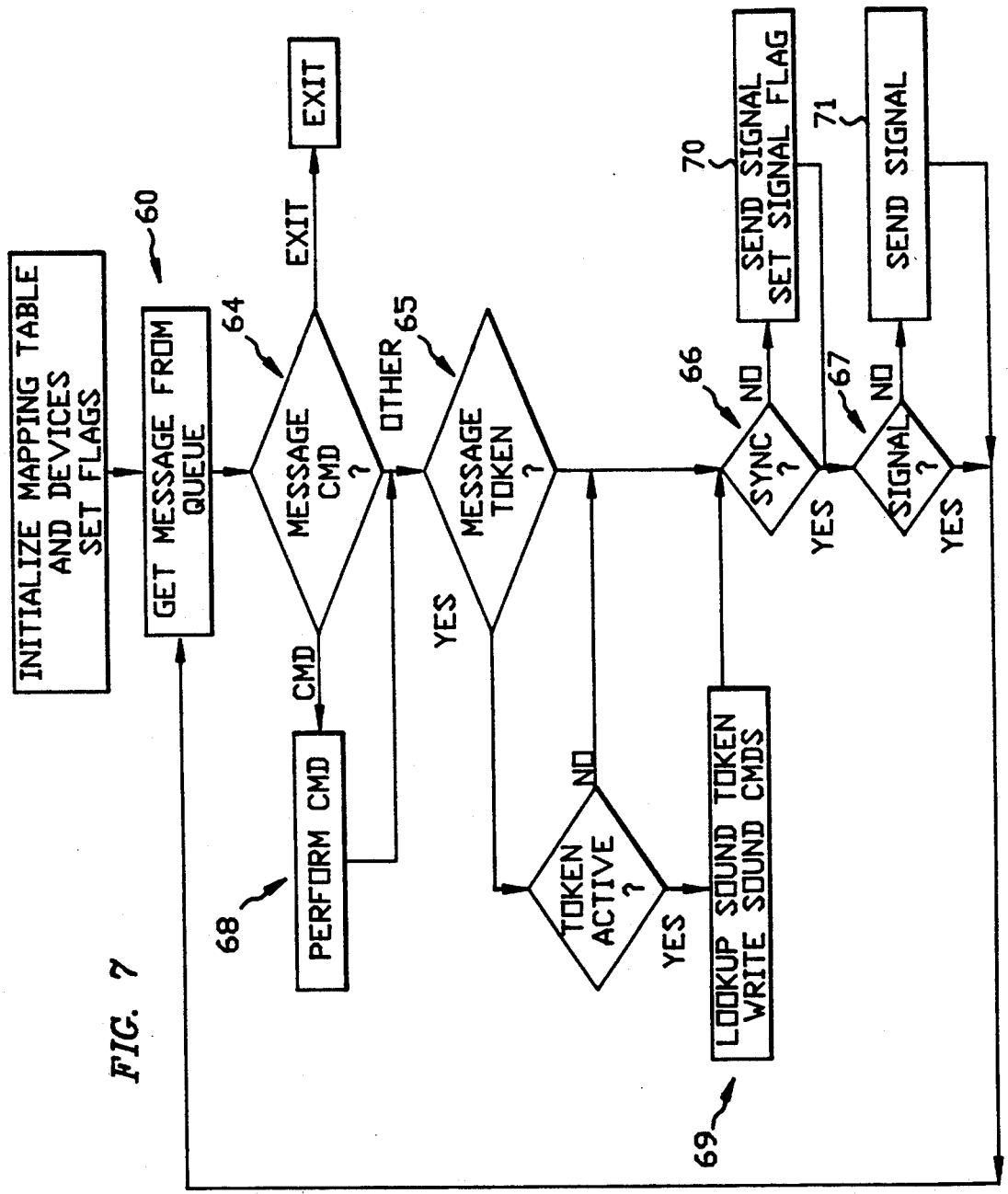
FIG. 7 presents a flow chart of an auditory device driver.

A flow chart for the auditory device driver is shown in FIG. 7. The auditory device driver is comprised of a command loop which fetches (step 60) and executes commands from a command queue that is filled by auditory function calls or messages from the auditory event editor. The command loop parses commands (step 64), sound tokens (step 65), and special flags (steps 66 and 67). A global command such as START or STOP is executed immediately (step 68). If a sound token is fetched from the message queue, the token is used to find commands for the sound generation devices in the sound token mapping table, and the commands are written to the device (step 69). The device driver also sends signals at steps 70 and 71 to the auditory function calls for the synchronization of sound with program execution.

Table 5 illustrates the function of the auditory device driver. The device driver first reads a default sound token mapping table, initializes the sound generation devices, and sets flags for synchronizing the sound generation with the debug process (lines 100–140).

After initialization, the auditory device driver enters a command loop (lines 150–230). The device driver fetches a message from the queue (line 160). This message is compared against global sound commands and sound tokens. The synchronization commands set flags to signal the function call to return immediately or to wait until the sound finishes playing (lines 170–180). Other commands include functions for global sound control. EXIT (line 190) terminates the sound driver; SILENCE (line 200) prevents a sound device from playing a sound; SPEAK (line 210) enables a device for sound; PAUSE (line 220) interrupts the playing of a current sound; RESUME (line 230) resumes the playing of an interrupted sound; STOP (line 240) stops playing the current sound and resets the device to play a new sound.

If the message is a sound token, the auditory device driver checks to see if the sound token is marked active (lines 250–260). If the sound token is active, the sound device commands are obtained from the sound token mapping table and written to the sound device (lines 270–290).

After the message has been interpreted by the auditory device driver, the driver checks to see if it should signal the calling function to return immediately or wait until the current sound has finished playing. If synchronization is not enabled, then a signal is sent for the calling function to return (lines 300–330). The auditory device driver then waits for the sound to finish or for a predetermined amount of time (default=100 milliseconds) before continuing (line 340). The driver then sends a signal to the calling function if the signal has not already been sent (line 350), resets the signal flag (line 360) and continues to fetch more messages from the message queue until it receives an exit command. Note that each function call is unique. Therefore, each signal from the device driver corresponds with a unique function call. If the auditory function call associated with a signal has returned before the corresponding signal is issued, that signal is ignored even if another function call is waiting for a signal.

AUDITORY EVENT EDITORY

The auditory event editor controls both the mapping of sound tokens to program elements and the mapping of sound tokens to sound control parameters. The event editor carries out this function by allowing the user to edit the mapping tables.

Figure 8:
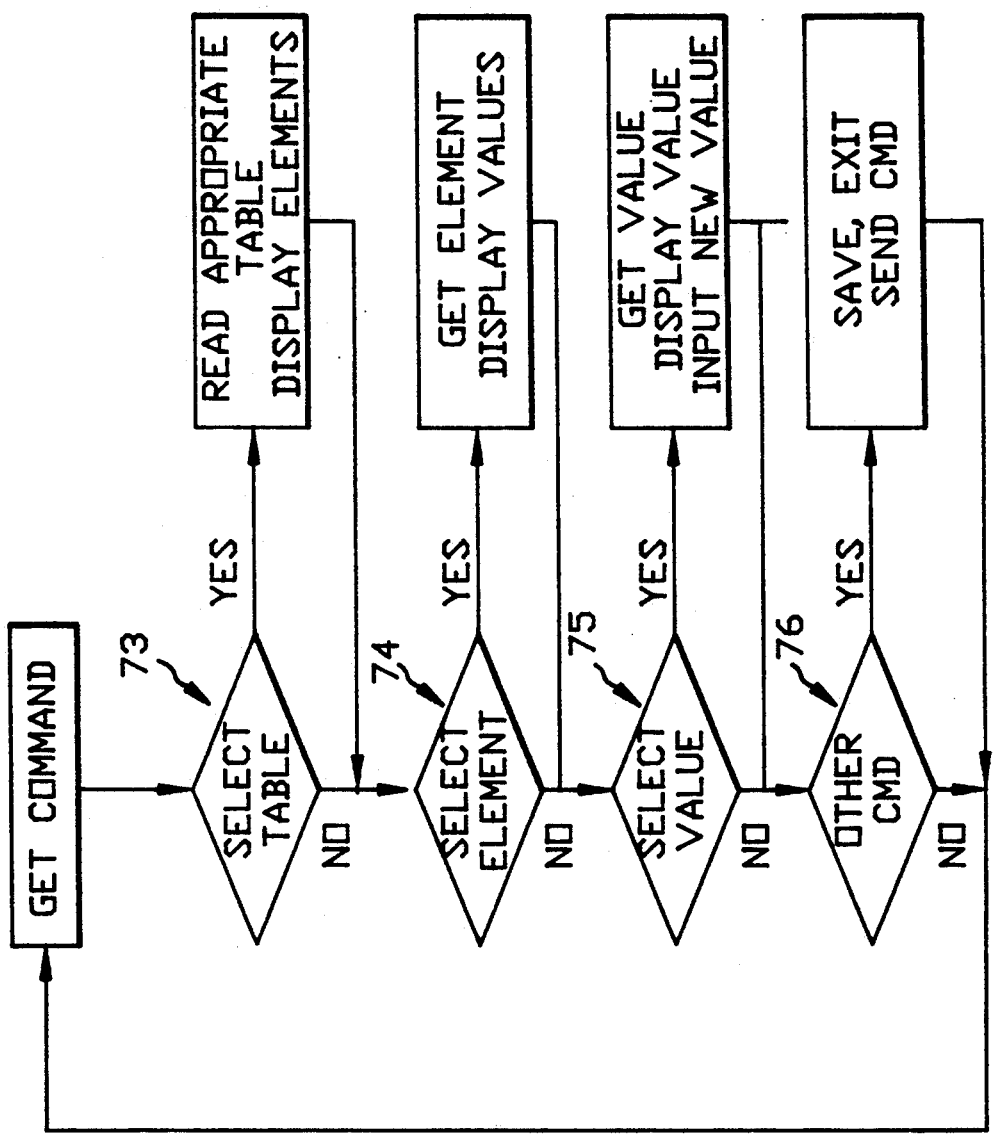

FIG. 8 presents a flow chart of the auditory event editor. The auditory event editor consists of a command loop. The user can issue commands to select either a program element mapping table or a sound token mapping table (step 73), select an element in the table (step 74), select and edit the value of a table element (step 75) or issue auditory device driver or other event editor command step 76).

The pseudo-code program fragment of Table 6 illustrates the function of the auditory event editor. When the auditory event editor is started, it enters a command loop (line 100-110). At this point, the user can choose to edit a table or send a global sound command to the device driver. For table editing, the user can choose to edit either a program element or sound token mapping table (lines 130-170). The user will likely select the program element mapping table to assign sound tokens to syntactical elements such as keywords, data objects and operators or messages before compiling or executing the program of interest. The user may choose to edit the sound token mapping table before, during, or after program execution. The sound token mapping table translates a sound token into sound generation device parameters that control the volume, timbre, pitch or other dimensions of sound that can be produced by the target sound generation device. Predefined tables allow the user to select a default program element map for a target language and a default sound token map for maximum discrimination among sound tokens. After the user selects a table, the contents of the selected table are read into the internal variable editTable of the auditory event editor (lines 140-150). The table contents may be read from files or memory. For example, the auditory device driver maintains a current sound token mapping table; the auditory event editory can read the table from the auditory device driver to change the characteristics of the sound while the debug process is executing. The variable editTable consists of element names and their associated values. The contents of editTable depend on the type of table selected. If the user selected a program element mapping table, the editTable's element names are the program element symbols such as keywords, data operators or message names. The values associated with these element names are sound tokens. If the user selected a sound token mapping table, the sound token symbols are the table element names and their associated values are tables that contain control values for a sound generation device. One sound token can be associated with a multi-element table that controls pitch, timbre, and other sound attributes.

The element names of the editTable are then displayed in a list on a computer screen (line 160). The user can select an element name from this list, generating a select TableElement command. The editor then gets the values associated with the table element name and displays them to the user (lines 180-210). If the table variable contains a program element mapping table and the user selects a table element name such as a keyword, the sound token assigned to that keyword would be displayed. If the table variable contains a sound token mapping table and the user selects a sound token, the table element names associated with the sound token would be displayed. The user can then edit the table element values (lines 220-260). The user selects a value, generating a selectValue command. The editor then retrieves the value and displays it to the user. For the program element mapping table, the values are individual sound tokens. The user can change these sound tokens to change the default mapping of a keyword, for example. For the sound token mapping table, the values are the individual table element names and associated values, for example: pitch, amplitude, timbre. The user can change these values with the auditory event editor.

The auditory event editor also provides a means for controlling the auditory device driver. The editor does this by sending global sound commands to the device driver's message queue (line 290). Thus, the user can select commands to silence or enable the sound device at any time, control synchronization or control the playing of the current sound.

TABLE 1

```
100   READ Keyword Table into table
         /*Table of keywords to map with sound read from
         program element mapping table*/
110   skip = false
         /*Disable skipping as default*/
120   wait = true
         /*Enable wait for auditory device driver signal as
         default*/
130   DO
         /*Process all target program source code lines*/
140      READ Source Code Line into line
            /*Read target program source code line from file*/
150      IF line == END_OF_SOURCE then EXIT
            /*Exit when all code has been processed*/
160      IF line == SOUND_MAP_ON THEN skip = false
            /*Turn on mapping until SOUND_MAP_OFF
            encountered*/
170      IF line == SOUND_MAP_OFF THEN skip = true
            /*Turn off mapping until SOUND_MAP_ON
            encountered*/
180      IF skip GOTO 110
            /*If skip is true, discontinue processing*/
190      IF line == DISABLE_KEYWORD keyword THEN DISABLE
               keyword in table
            /*Disable mapping for a single keyword by marking
            the keyword as disabled in table*/
200      IF line == ENABLE_KEYWORD keyword THEN ENABLE
               keyword in table
            /*Enable mapping for a single keyword by marking
            the keyword as enabled in table*/
210      IF line == WAIT_OFF then wait = false
```

TABLE 1-continued

```
                /*Disable wait for auditory device driver
                   signal*/
220     IF line == WAIT_ON then wait = true
                /*Enable wait for auditory device driver signal*/
230     IF line == program statement DO
                /*break line into word tokens*/
240         word = PARSE(line)
                /*get a word token from line*/
250         IF word == END_OF_LINE THEN GOTO 110
                /*get another line*/
260         IF word included in Table AND word not disabled
                in Table THEN DO
                /*check to see if keyword should be mapped*/
270             FIND syntactically correct position in line
                    /*find position in line to insert
                       function call*/
280             GET soundTOKEN from keyword table
                    /*lookup soundToken for keyword*/
290             IF wait == true THEN set wait flag in
                    function call
                    /*set up function call parameters*/
300             INSERT auditory function call
                    /*insert function call with wait flag and
                       sound token as parameters*/
310         END
                /*keyword processing loop*/
                /*get another line*/
320     END
                /*line processing loop*/
```

TABLE 2

```
READ Operator and Data Object Name table into table
    /*Table of data object names and operators read from
       program element mapping table*/
skip = false
    /*Disable skipping as default*/
wait = true
    /*Enable wait for auditory device driver signal as
       default*/
    DO
        /*Process all target program source code lines*/
    READ Source Code Line into line
        /*Read target program source code line from file*/
    IF line == END_OF_SOURCE THEN EXIT
        /*exit when all code has been processed*/
    IF line == SOUND_MAP_ON THEN skip = false
        /*Turn on mapping until SOUND_MAP_OFF
           encountered*/
    IF line == SOUND_MAP_OFF THEN skip = true
        /*turn off mapping until SOUND_MAP_ON
           encountered*/
    IF skip GOTO 110
        /*If skip is true, discontinue processing*/
    IF line == DISABLE_DATAOBJ dataobject THEN DISABLE
                dataobject in table
        /*Disable mapping for a single dataobject or
           datatype by marking the dataobject or datatype
           as disabled in table*/
    IF line == ENABLE_DATAOBJ dataobject THEN ENABLE
                dataobject in table
        /*Enable mapping for a single dataobject or
           datatype by marking the dataobject or datatype
           as enabled in table*/
    IF line == DISABLE_ASSIGNMENT THEN DISABLE
                assignment operators in table
        /*Disable mapping for assignment operators by
           marking all assignment operators as disabled in
           table*/
    IF line == ENABLE_ASSIGNMENT THEN ENABLE assignment
                operators in table
        /*Enable mapping for assignment operators by
           marking all assignment operators as enabled in
           table*/
    IF line == DISABLE_ACCESS THEN DISABLE access
                operators in table
        /*Disable mapping for access operators by marking
           all access operators as disabled in table*/
    IF line == ENABLE_ACCESS THEN ENABLE access
                operators in table
        /*Enable mapping for assignment operators by
```

TABLE 2-continued

```
            marking all access operators as enabled in
            table*/
IF line == WAIT_OFF then wait = false
    /*Disable wait for auditory device driver signal*/
IF line ==WAIT_ON then wait = true
    /*Enable wait for auditory device driver signal*/
IF line == program statement DO
    /*check program statement for data
        access/transformation*/
        word = PARSE(line)
            /*get program token*/
        IF word == END_OF_LINE THEN GOTO 110
            /*get another line*/
        IF word == dataobject THEN DO
            /*if program element is a dataobject*/
            operator = PARSE(line)
                /*find matching operator*/
            IF word in table AND word not disabled AND
                    operator in table AND operator not
                    disabled THEN DO
                /*if dataobject and data operator
                    enabled*/
                FIND syntactically correct position in
                    line
                /*find a place to insert an auditory
                    function call*/
                GET sound tokens for operator and data
                    object
                /*get sound tokens from table*/
                COMBINE sound tokens into a single sound
                    token
                /*create one sound token for auditory
                    function call*/
                INSERT auditory function call
                /*insert function call with wait flag
                    and sound token as parameters*/
                END
                    /*function call insert routine*/
            END
                /*data object processing*/
        END
            /*line processing*/
END
```

TABLE 3

```
READ message table into table
    /*Table of messages to map with sound read from
        program element mapping table*/
DO
    /*Process all messages*/
    GET message
        /*GET message from message queue*/
    IF message == exit THEN EXIT
        /*exit when exit message received*/
    PARSE(message, name, source, destination, arguments)
        /*parse message into name, source object,
            destination object and # of arguments*/
    IF name included in table AND name not disabled THEN
        DO
        /*check for message entry in table*/
            GET all sound token entries for table
                /*lookup sound tokens for message
                    components*/
            COMBINE sound tokens into a single sound
                token
                /*create one sound token for auditory
                    function call*/
            CALL device driver
                /*make auditory function call*/
        END
        /*message parsing*/
    SEND message
        /*pass message to destination object*/
END
    *message loop*/
```

TABLE 4

```
CALL auditory device driver
```

TABLE 4-continued

```
    /*Call device driver with sound tokens and control
        flags*/
IF wait flag set THEN WAIT for signal
    /*signal sent by auditory device driver*/
RETURN
```

TABLE 5

```
READ configuration into sound token mapping table
    /*Table maps control messages to device commands or
        program control*/
INITIALIZE Devices
    /*Any initialization required for sound devices*/
SPEAK
    /*Enable device to play sound*/
signal = FALSE
    /*if signal is false, the auditory function call has
        not yet been signaled*/
synchronize = FALSE
    /*Assume no synchronization*/
DO
    /*process auditory function call messages*/
    GET message from queue
        /*Get next message*/
    IF message == sync THEN synchronize = TRUE
        /*Set synchronization*/
    IF message == noSync THEN synchronize = FALSE
        /*Reset synchronization*/
    IF message == exit THEN EXIT
        /*terminate device drive process*/
    IF message == silence THEN SILENCE
        /*prevent device from playing sound until speak
            message received*/
    IF message == speak THEN SPEAK
```

TABLE 5-continued

```
       /*enable device to play sound*/
IF message == pause THEN PAUSE
       /*command device to pause playing current sound*/
IF message == resume THEN RESUME
       /*command device to resume playing current sound*/
IF message == stop THEN STOP
       /*command device to stop playing current sound and
          reset for new sound*/
IF message == sountToken THEN DO
   /*play a sound*/
   IF message active THEN DO
                /*check to see if sound is enabled for this
                   message*/
                soundCommands == LOOKUP soundToken
                  /*get soundCommands for device from table
                     using soundToken as table index*/
                END
       WRITE soundCommands
                /*write soundCommands to device*/
       IF synchronize == FALSE THEN DO
                /*if no synchronization, then*/
                SIGNAL caller
                   /*signal auditory function call to return
                      immediately*/
                signal = TRUE
                   /*signal has been sent*/
                END
                /*check for signal*/
       WAIT
          /*wait for signal from sound hardware or
             software*/
       IF signal == FALSE THEN SIGNAL caller
          /*if the caller has not yet been notified, signal
             the caller*/
       signal = FALSE
          /*reset signal*/
       END
          /*sound token processing*/
END
   /*device processing*/
```

TABLE VI

```
DO
/*loop until exit command*/
GET command
/*get command from user*/
IF command == selectList THEN DO
/*user selects a table to edit */
       SELECT tableType
          /*get table type to edit from user*/
       IF tableType == soundTokens THEN
          READ Sound token mapping table into editTable
          /*fill editTable with sound tokens and associated
             values*/
       IF tableType == programElements THEN
          READ program element mapping table into
             editTable
          /*fill list with keywords and related sound tokens*/
       DISPLAY editTable
          /*display table elements to user*/
       END
          /*end select table command*/
IF command == select TableElement THEN DO
   /*user selects a table element to edit*/
       GET tableElement
          /*get name of table element to edit*/
       values = editTable(tableElement)
          /*get values from table using tableElement as
             index*/
       DISPLAY values
          /*display list of values for selected tableElement*/
       END
          /*end selectTableElement command*/
IF command == selectValue THEN DO
   /*user selects a value to edit*/
       GET value
       DISPLAY value
          /*display parameter value*/
       INPUT value
       *get new value*/
```

TABLE VI-continued

```
       UPDATE editTable
          *new value is immediately available*/
       END
          *end selectValue command*/
IF command == SAVE THEN save table
   /*Save table to file*/
IF command == EXIT THEN exit
   /*Exit auditory event editor*/
IF command == globalSoundCommand THEN SEND
                globalSoundCommand
   /*send a global sound command message to the device
      driver*/
END
   *End command loop*/
```

The invention being thus described, ;it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. In a computer system including means for parsing a computer program, means for executing a computer program and means for generating sounds in response to computer program events, a method for audibly communicating computer program execution, comprising the computer system-executed steps of:

in response to a computer program which includes syntactical elements:
    identifying respective syntactical elements as syntactical cues by parsing lines of the computer program element by element; and
    mapping a set of sounds to the set of syntactical cues;
    executing the computer program; and
    during execution of a procedural sequence in the computer program, generating a pattern of sounds in response to syntactical cues contained in the procedural sequence, the pattern of sounds including sounds in the set of sounds.

2. The method of claim 1, in which the step of identifying includes:
    constructing a table; and
    entering into the table keywords which control the order in which the computer program is executed.

3. The method of claim 1, in which the step of identifying includes:
    constructing a table;
    entering into the table keywords which control processing of data during execution of the computer program.

4. The method of claim 1, in which the step of identifying includes:
    constructing a table; and
    entering into the table messages which are passed during execution of the computer program.

5. The methods of claims 2, 3, or 4 in which the step of mapping includes entering into the table a sound token corresponding to a respective sound of the computer system for each keyword or message in the table.

6. The method of claim 1, wherein the step of mapping includes entering into the computer program at each syntactical cue of a plurality of syntactical cues a call for generation of a respective sound of the computer system.

7. The method of claim 1, wherein:

the step of mapping includes:
constructing a table;
entering the set of syntactical cues into the table together with associated sound tokens which represent sounds of the computer system, such that each syntactical cue in the table is associated by the table with a particular sound token;
receiving syntactical elements of the computer program;
comparing the syntactical elements with syntactical cues in the table; and
if a syntactical element is in the table, making a call to the computer program for generation of a sound which is associated with the syntactical element by the table; and
the step of generating includes executing calls to the computer program for generation of sounds.

8. A machine-executable method for debugging a computer program using auditory means, including the steps of:
mapping a set of predetermined syntactical cues into a set of auditory properties;
parsing lines of the computer program element-by-element to identify syntactical cues included in the set of predetermined syntactical cues;
executing procedural sequences of the computer program, the procedural sequences including a plurality of syntactical cues identified as predetermined syntactical cues; and
synchronizing and correlating the execution of the procedural sequences with patterns of sounds generated by said auditory means during the execution of the procedural sequences in response to the plurality of syntactical cues, said sounds including said auditory properties.

9. In a computer system including means for receiving, parsing, compiling, and executing a computer program and means for generating sounds in response to computer program events or computer program objects during execution of the computer program, a method for providing auditory information for debugging the computer program, the method including the steps of:
providing a computer program to the computer system;
parsing lines of the computer program, element by element, to identify syntactical cues in the computer program;
mapping the syntactical cues in the computer program to auditory events;
executing the computer program; and
generating patterns of sounds which include the auditory events during execution of procedural sequences of the computer program in response to syntactical cues contained in the procedural sequences.

10. In a computer system including means for executing computer programs and means for generating sounds in response to sound commands, a combination for debugging a computer program, the combination comprising:
mapping means for mapping a set of computer program syntactical elements to a set of auditory events;
means in the mapping means for parsing the computer program and providing in the computer program a respective sound token for each syntactical element in the set of syntactical elements which is in the computer program, the respective sound token representing an auditory event mapped to the syntactical element; and
means responsive to a sequence of sound tokens provided during occurrence of a sequence of syntactical elements produced by execution of the computer program for providing a sequence of sound commands to the means for generating a pattern of sounds during execution of the computer program.

11. In the computer system including means for executing object-oriented computer programs and means for generating sounds in response to sound commands, a combination for debugging an object-oriented computer program, the combination comprising:
mapping means for mapping a set of message syntactical elements to a set of auditory events;
means in the mapping means for parsing messages during execution of the computer program and providing a respective sound token for each syntactical element in the set of syntactical elements found in a message, the respective sound token representing an auditory event mapped to the syntactical element; and
means responsive to a sequence of sound tokens provided during occurrence of a message containing a sequence of syntactical elements produced by execution of the computer program for providing a sequence of sound commands to the means for generating a pattern of sounds.

* * * * *